Patented Mar. 24, 1942

2,277,033

UNITED STATES PATENT OFFICE 2,277,033

ALKYL ESTER OF 9-CYANO-NONANOIC ACID

William S. Bishop, Cranford, N. J., assignor to Bell Telephone Laboratories, Incorporated, New York, N. Y., a corporation of New York No Drawing. Application November 22, 1940, Serial No. 366,717

2 Claims. (Cl. 260—464)

This invention relates to a new composition of matter, an alkyl ester of 9-cyano-nonanoic acid, and more particularly to the methyl ester of 9-cyano-nonanoic acid, or 9-cyano-methyl-nonanoate, $NC-(CH_2)_8-CO-O-CH_3$.

While the novel substance of the present invention may be employed for various purposes, it is particularly useful as an intermediate substance in the manufacture of high molecular weight linear polymers from which sheets, coatings, impregnants, fibers, threads or the like may be made.

Although any one of various methods may be employed, the methods of preparation of the composition of matter of the present invention indicated by the following illustrative examples are preferable.

Example 1

According to this example the 9-cyano-methyl-nonanoate of the present invention is prepared by dehydration of the methyl ester of sebacic amide, which in turn may be prepared from the methyl ester of sebacic acid chloride by reaction with concentrated ammonium hydroxide. The acid chloride ester in turn may be produced from monomethyl sebacate by reaction with thionyl chloride. The monomethyl sebacate may, if desired, be produced from sebacic acid or sebacic anhydride by reaction with methyl alcohol, or by other means, as by hydrolizing one methyl group of dimethyl sebacate.

As a more specific example, residue from the distillation of sebacic acid, consisting of a mixture of sebacic acid and sebacic anhydride, is refluxed with commercial methanol for about 24 hours. The excess alcohol, then the dimethyl ester which is formed, and finally the monomethyl ester, monomethyl sebacate, is distilled off. To free it of traces of the dimethyl ester, the monomethyl ester may then be dissolved in sodium caribonate solution, the resulting sodium salt of the monoester being treated with acid to form again the monomethyl sebacate, which is fractionated to isolate it. The boiling point of the resulting monomethyl sebacate, $$HO-OC-(CH_2)_8-CO-O-CH_3$$

is about 178° C. at a pressure of 5 mm. of mercury and about 188° C. at a pressure of 10 mm. of mercury.

Thionyl chloride, $SOCl_2$, and the monomethyl sebacate in proportions of 177 parts of the former to 324 parts of the latter are then reacted at 50° C. to 60° C. until the reaction is complete, about an hour being required. The desired reaction product, the methyl ester of the chloride of sebacic acid, $$Cl-OC-(CH_2)_8-CO-O-CH_3$$

is a liquid at room temperatures.

The methyl ester of the chloride of sebacic acid is not separated from its other reaction products, but the mixture is dropped into concentrated ammonium hydroxide. At room temperature a rapid reaction occurs, with the precipitation of the amide of the methyl ester of sebacic acid, $NH_2-CO-(CH_2)_8-CO-O-CH_3$. The yield of the crude amide ester from 324 grams of the monoester is 290 grams, or about 90 per cent. To purify the amide ester it may be recrystallized from water. In the pure form it is a white crystalline solid which melts at about 77.4° C. and is insoluble in water.

To produce the substance of the present invention, a predetermined amount of the above-indicated amide ester, 100 grams for example, is mixed with a like amount of phosphorous pentoxide, $P_2O_5$, in a mortar. The mixture is then transferred to a large flask and covered with a suitable liquid solvent, such as tetrachloroethane. The mixture is heated at about 150° C. for one-half hour, the heating being accomplished, if desired, by immersion of the flask in an oil bath heated to the desired temperature. The solvent containing the reaction product is decanted and collected, the residue in the flask being recovered with fresh solvent and again heated to the same temperature for about the same length of time, after which the reaction product containing the solvent is decanted and collected and the procedure again repeated. The procedure may be repeated until no appreciable reaction product is obtained; usually four or five repetitions are necessary. The 9-cyano-methyl-nonanoate is recovered from the collected solvent by fractional distillation. A yield of as high as 71 per cent of the calculated yield is possible.

Example 2

According to this method of preparing the above-mentioned substance, the amide or diamine of sebacic acid is heated until one of the amide groups is dehydrated to the nitrile group. The resulting mononitrile derivative of the sebacic acid is then esterified to produce the methyl-ester. The preferred procedure is to form the diamide of the acid and dehydrate it in one operation.

This may be accomplished by mixing together sebacic acid and an ammonia-forming substance, such as urea, the amount of the ammonia-forming substance employed preferably being only slightly, if any, greater than the amount calculated to form the diamide. The acid and ammonia-forming material are heated together for several hours at a temperature of from about 180° C. to 200° C., the amide and dinitrile of sebacic acid formed by reaction of the acid and the urea being dehydrated to the mono- and dinitriles. The mixture of reaction products is distilled without isolation of the amide. The reaction product mixture contains the mononitrile and the dinitrile of sebacic acid, as well as the acid itself. The amount of the mononitrile present in the reaction product mixture is governed by the amount of the ammonia-producing substance provided initially, which amount preferably should be less than the amount calculated to convert the acid to the diamide. Yields of the mononitrile of as high as 50 per cent may thus be obtained.

The mononitrile of sebacic acid,

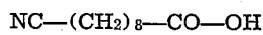

$NC-(CH_2)_8-CO-OH$ from which the substance of the present invention is obtained may be obtained from the reaction product mixture by washing the distillate containing the mixture with sodium carbonate solution, which causes the formation of soluble sodium salts of both sebacic acid and the mononitrile of said acid. The aqueous solution containing these salts may be readily separated from the oily dinitrile of sebacic acid. The aqueous solution may then be neutralized, and an excess of barium chloride added thereto. After the solution has been heated to boiling, it is filtered hot. Since barium sebacate is quite insoluble in hot water containing an excess of barium ions, it is left on the filter; the barium salt of the mononitrile of sebacic acid is quite soluble in hot water and hence passes into the filtrate. When the filtrate is acidified and chilled, the mononitrile separates as an oil which solidifies on being cooled and may be readily filtered from the aqueous filtrate. To remove organic impurities the mononitrile may be again liquefied in hot water, caused to resolidify, and refiltered.

The 9-cyano-nonanoic acid resulting from this procedure is then esterified. The methyl ester may be prepared by reacting with the mononitrile of sebacic acid an excess of methyl alcohol together with a small amount of para-toluene sulphonic acid as a catalyst, or by the action of dimethyl sulphate on the sodium salt of 9-cyano-nonanoic acid in alcohol. The resulting 9-cyano-methyl-nonanoate may be recovered by fractional distillation.

The process of making the mononitrile indicated in this example forms no part of the present invention, but is disclosed and claimed in copending application Serial No. 366,721 filed November 22, 1940, by B. S. Biggs.

*Example 3*

In this process, which is a modification of that of Example 2, after the diamide of sebacic acid or the mixture of sebacic acid and urea has been heated until dehydration is complete, the mixture of reaction products, without distillation thereof, is dissolved in methyl alcohol. A small amount of sulphuric acid is added as a catalyst and the whole is refluxed for about 36 hours. After the product has been washed with water and with sodium carbonate solution, it comprises the dinitrile of sebacic acid, dimethyl sebacate and the desired 9-cyano-methyl-nonanoate. The latter may be recovered by fractional distillation. The dinitrile and the dimethyl sebacate may be recycled in subsequent runs so that the only product isolated is the desired cyano ester.

The process indicated in this example forms no part of the present invention, but is disclosed and claimed in copending application Serial No. 366,722, filed November 22, 1940, by B. S. Biggs.

*Example 4*

In this process, one of the nitrile groups of the dinitrile of sebacic acid is hydrolyzed to the acid and the methyl ester is formed by reaction of the resulting carboxyl group with methyl alcohol to form the ester. The dinitrile may be obtained from any suitable source, or may be prepared by a process similar to that indicated in Example 2, a larger amount of ammonia-producing substance being employed to obtain a larger yield of the dinitrile.

More specifically, one mol of dinitrile is dissolved in excess methyl alcohol, and one mol of $H_2O$ and one-half mol of $H_2SO_4$ are added. The solution is refluxed for about twenty-four hours and is then washed with water and with sodium carbonate solution. Distillation yields a large fraction of practically pure 9-cyano-methyl-nonanoate and a remainder of unchanged dinitrile which can be reused.

The process indicated in this example also forms no part of the present invention but is disclosed and claimed in copending application Serial No. 366,723, filed November 22, 1940, by B. S. Biggs.

The 9-cyano-methyl-nonanoate,

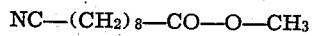

$NC-(CH_2)_8-CO-O-CH_3$ of the present invention is a water white, water insoluble liquid of a density of .934 gram per cc. at 23.5° C., having a boiling point of 178° C. at 5 mm. of mercury or 188° C. at 10 mm. of mercury and having a refractive index of 1.4398 at 25° C. While it may be used for various purposes, it may be employed to particular advantage in the preparation of 1,10 decanolamine by a suitable reduction process, which product may advantageously be employed in the manufacture of high molecular weight polymers having valuable properties.

While the above-described methods for preparing the novel composition of matter of the present invention are preferable, it is apparent that various modifications may be made therein and that the product may be produced by other processes without departing from the spirit of the invention.

It is intended that the patent shall cover in the appended claims whatever features of patentable novelty reside in the invention.

What is claimed is:
1. An alkyl ester of 9-cyano-nonanoic acid.
2. The methyl ester of 9-cyano-nonanoic acid.

WILLIAM S. BISHOP.